Aug. 26, 1969     J. A. FREZZOLINI     3,463,996
BATTERY DISCHARGE APPARATUS
Filed Nov. 14, 1966     2 Sheets-Sheet 1
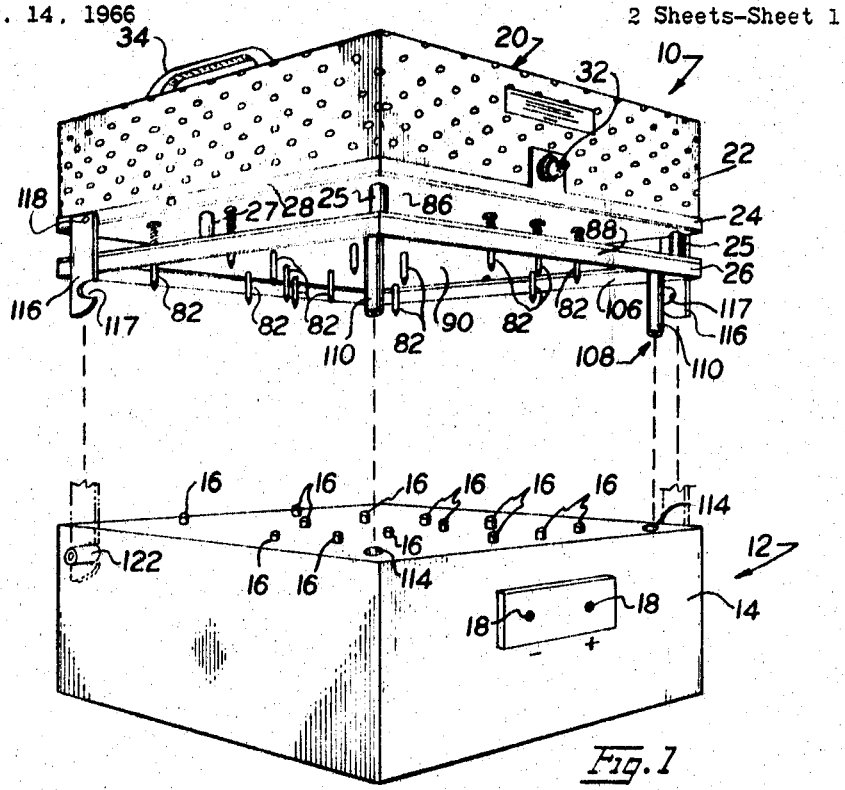
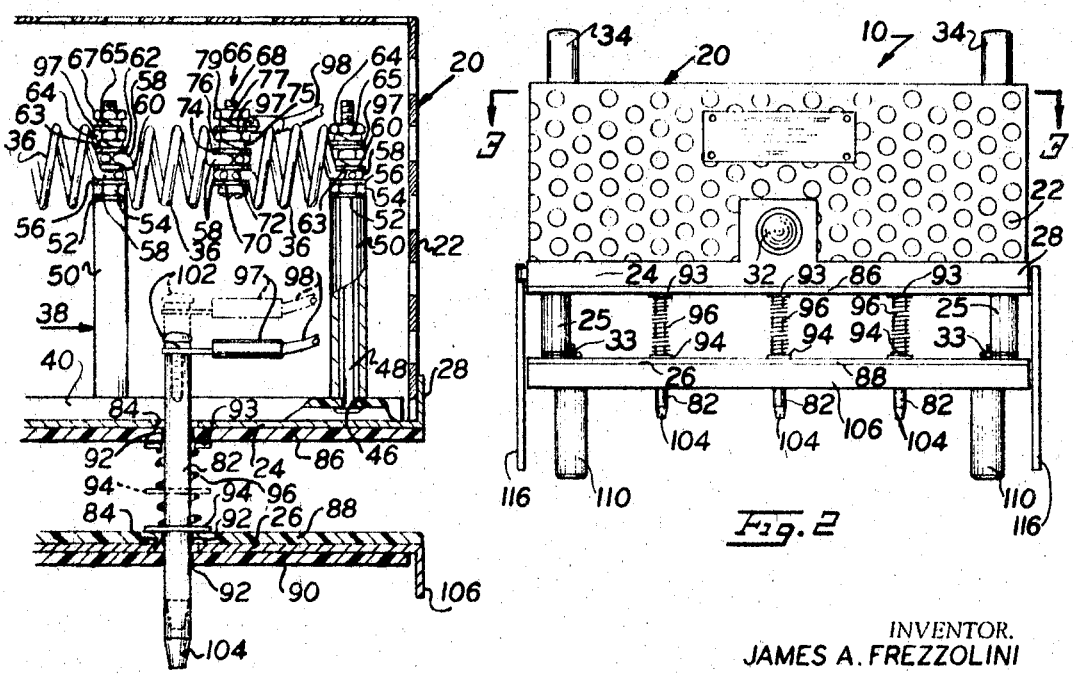
INVENTOR.
JAMES A. FREZZOLINI
BY
ATTORNEYS

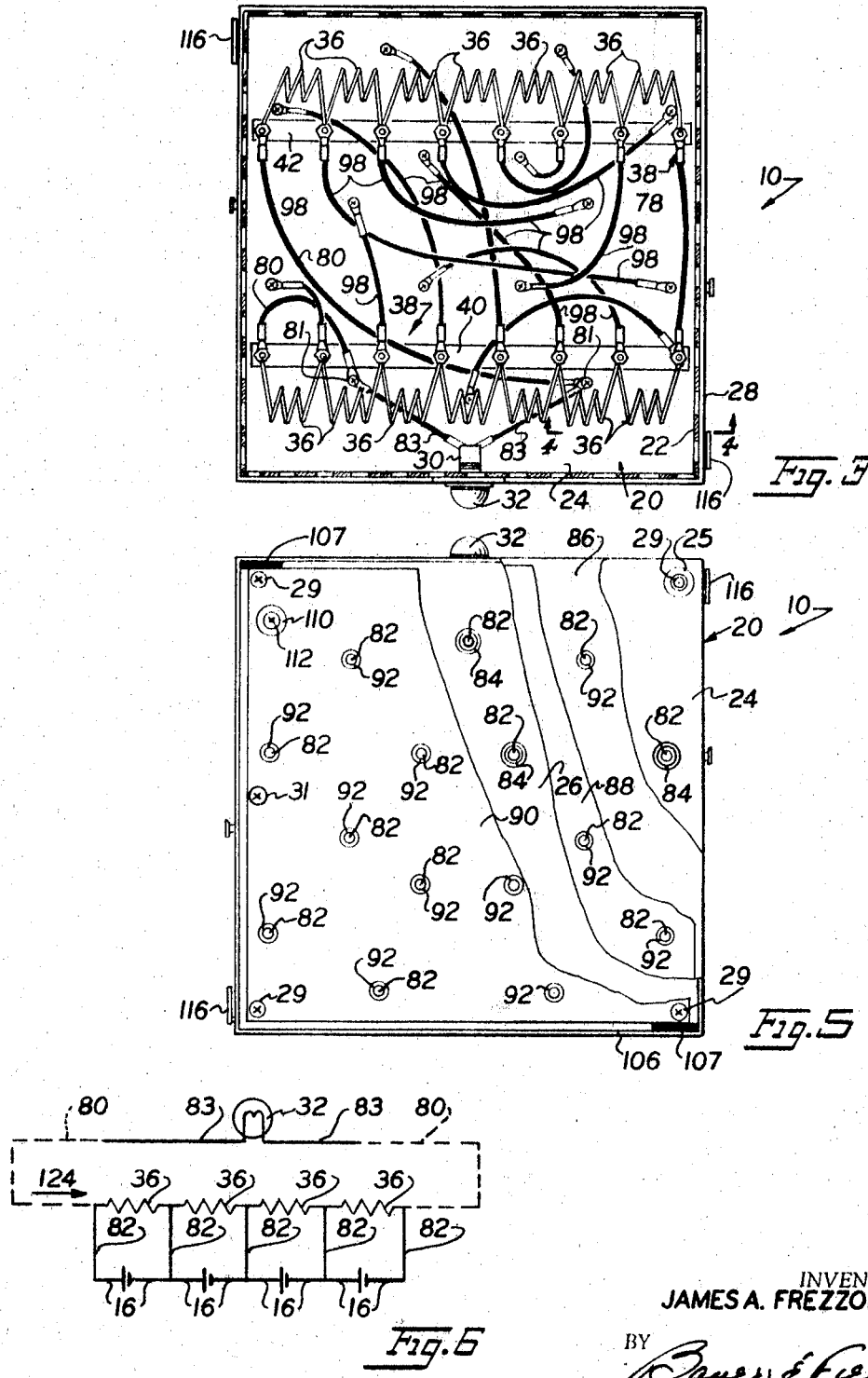

United States Patent Office 3,463,996
Patented Aug. 26, 1969

3,463,996
BATTERY DISCHARGE APPARATUS
James A. Frezzolini, Bronx, N.Y., assignor to United Aerotest Laboratories, Inc., Deer Park, N.Y., a corporation of New York
Filed Nov. 14, 1966, Ser. No. 593,968
Int. Cl. H01m 45/04
U.S. Cl. 320—17          18 Claims

ABSTRACT OF THE DISCLOSURE

A battery discharge apparatus for simultaneously discharging a plurality of battery cells comprising a plurality of load impedances connected in a series loop. Lead means is provided for connecting individual ones of the load impedances across respective battery cells whereby the battery cells are discharged and the possibility of damage to the cells by reverse polarity charging is eliminated.

---

This invention relates generally to improvements in battery discharge apparatus and, more particularly, pertains to a battery discharge apparatus for efficiently discharging the individual cells which comprise a battery.

In many electrical applications it is necessary to completely discharge all of the individual cells which comprise a battery. For example, a battery is required to be drained completely of all charge prior to a formation charge cycle or a capacity maintenance check. Consequently, many devices have been provided for discharging a battery. However, these devices suffer from a number of drawbacks which make their use uneconomical and, in some cases, highly dangerous.

To be more explicit, if current is made to flow through a cell in a reverse direction due to, for example, an unbalanced state of charge, a chemical reaction occurs within the cell which may cause the cell to be destroyed. This process is usually accompanied by the generation of heat and gases and in, in some cases, fire thereby resulting in an extremely hazardous operation. In order to prevent such an occurrence, complex circuits have been utlized in some types of battery dischargers which substantially added to their cost. Moreover, battery discharge apparatus of the type used heretofore have required an operator to continuously monitor the battery output voltage. However, this practice is time-consuming and exceedingly costly since it requires a person to constantly attend to the discharge apparatus.

Accordingly, the desideratum of the present invention is to provide a battery discharge apparatus which uniformly discharges each cell comprising a battery while providing a balanced discharge condition until the battery is completely drained.

Another object and feature of the present invention resides in the novel details of construction which provide a battery discharging apparatus which eliminates the need to continuously monitor the output voltage during a discharge cycle thereby to increase the efficiency of operation of the apparatus.

A further object of the present invention is to provide a battery discharge apparatus which includes means for signalling the termination of a discharge cycle.

In furtherance of the above objects, the battery discharge apparatus of the present invention includes a housing which is sized to be received on a battery of the type comprising a plurality of individual cells connected together in a series loop between the two output terminals. Mounted within the housing is an individual load impedance for discharging each cell. The load impedances are connected in a series loop which includes a lamp. A pair of contact means are provided for each load impedance. Means are provided for mounting each pair of contact means on the housing and for positioning the pairs of contact means so that each pair of contact means engages the respective terminals of a different cell. The individual contact means in each pair of contact means are connected to the respective ends of the associated impedance in a preselected arrangement so that each load impedance is connected between a different pair of the contact means. Moreover, the contact means are further arranged so that a unidirectional current flows through the load impedances when the housing is received on the battery and is oriented in a predetermined position with respect to the battery. Additionally, indexing means are provided on the housing and the battery which are engageable with each other to prevent the housing from being conected with the battery when the housing is oriented in a position other than the predetermined position.

When the housing is connected to the battery, the connecting means automatically connect each cell across a different load impedance so that a unidirectional current flow through the series loop of load impedance and the lamp. Since the current flow is unidirectional, the current flowing through any one of the cells cannot reverse itself. Hence, the possibility of a cell destruction is eliminated. Moreover, as the end of the discharge cycle nears, the lamp grows dim and finally goes out thereby to notify the operator that the discharge cycle has been terminated.

A feature of the present invention is to provide a battery discharge apparatus for a battery of the type comprising a plurality of cells which uniformly discharges each cell through an individual load resistor while providing a balanced discharge condition to prevent current reversal through a cell.

Other features and advantages of the present invention will become more apparent from a consideration of the following detailed description taken in conjunction with the accompanying drawing, in which:

FIG. 1 is an exploded perspective view of a battery discharge apparatus constructed according to the present invention and a battery pack adapted to receive the discharge apparatus;

FIG. 2 is a front elevational view of the battery discharge apparatus shown in FIG. 1;

FIG. 3 is a sectional view thereof, taken along the line 3—3 of FIG. 2, illustrating the top of the apparatus with the cage removed;

FIG. 4 is a sectional view thereof, to an enlarged scale, taken along the line 4—4 of FIG. 3;

FIG. 5 is a bottom plan view with parts broken away, of the battery discharge apparatus shown in FIG. 1; and FIG. 6 is a schematic circuit wiring diagram of a battery 3—3 of FIG. 2, illustrating the top of the apparatus with the present invention.

A battery discharge apparatus constructed in accordance with the present invention is illustrated in FIG. 1 and is designated generally by the reference numeral 10. The apparatus 10 is adapted to be received on a battery or battery pack, which is designated generally by the reference numeral 12, to discharge the cells which comprise the same.

The battery pack 12 includes a rectangular container 14 having a plurality of battery cells therein. Each one of the battery cells is provided with a pair of terminals 16 in the conventional manner. The battery cells are positioned in a preselected orientation and they are connected in a series loop between a pair of output terminals 18 which are mounted on the front wall of the container 14. Thus, the output voltage of the battery pack 12 will be equal to the sum of the voltages of the individual battery cells; it being understood that the output voltages of all of the battery cells are equal.

The battery discharge apparatus 10 includes a rectangular housing which is designated generally by the reference numeral 20. The housing 20 includes an upper cage section 22 which is releasably secured to a base plate 24 which, in turn, is releasably secured to and spaced from a lower plate 26. An insulating sheet 86 (FIGS. 2 and 4) coextensive in area with the plate 24, abuts the lower surface of the plate 24. On the other hand, a pair of insulating sheets 88 and 90, substantially coextensive in area with the plate 26, abut the respective upper and lower surfaces of the plate 26. The insulating sheets 86, 88 and 90 are utilized in the manner noted below to position and insulate the elements which contact the battery cell terminals 16.

The lower plate 26 and the insulating sheet 86 are spaced from the base plate 24 and the insulating sheets 88 and 90 by tubular spaces 25 (FIGS. 1 and 2) which are positioned at the corners of the plates, and tubular spacers 27 which are approximately centrally positioned adjacent the side edges of the housing 20. Screws 29 (FIG. 5) pass through appropriate apertures in the plates, the spacers 25, and the insulating sheets and are threadedly engaged in appropriate bores in the cage 22 to connect together the plates, the sheets and the cage 22 to provide the housing 20. Additionally, screws 31 pass through appropriate apertures in the sheet 90, the plate 26, the sheet 88, the spacers 27, the sheet 86 and are threadedly engaged in threaded bores in the plate 24 to connect together the sheets and the plates. Thus, the cage 22 may be removed from the subassembly comprising the plates 24 and 26 and the sheets 86–90 simply by removing the screws 29 without disturbing the alignment of the plates 24 and 26.

It is to be noted that washers 33 are provided intermediate the ends of the spacers 25 and 27 and the sheet 88 (FIG. 2). Thus, the upper ends of the tubular spacers bear against the sheet 86 and the washers 33 bear against the sheet 88 to maintain these sheets in place. On the other hand, the heads of the respective screws 29 and 31 bear against the sheet 90 to maintain this sheet in place. The cage section 22 and the plate members 24 and 26 may be fabricated from a metal such as steel or aluminum to provide a relatively strong housing for enclosing the electrical elements of the battery discharge apparatus 10.

The base plate 24 is provided with an upstanding peripheral flange 28 which is adapted to facilitate positioning of the cage 22 on the base plate 24. In other words, the cage 22 is received on the plate 24 with the lower portion thereof in juxtaposed relationship to the inner surface of the flange 28, as shown in FIGS. 2 and 3. The cage section 22 is of open-work construction to provide for the dissipation of heat from the interior of the housing 20 during the discharge cycle of a battery pack. Additionally, the front wall of the housing 20 mounts a lamp socket 30 having a lamp 32 therein which is operable to indicate the termination of a discharge cycle in the manner noted below. Provided on the top wall of the cage section 22 are opposed handles 34 which easily may be grasped to facilitate handling of the apparatus 10.

Received within the housing 20 are a plurality of load impedances 36 which are adapted to be connected across the respective cells of the battery pack 12 by appropriate contact elements in the manner noted hereinbelow to discharge the cells. That is, each one of the load impedances 36 is adapted to discharge a different one of the cells. The load impedances 36 may comprise coils of Michrome wire having equal resistances. To put this another way, the load impedances 36 are precision resistors which have equal resistance values. The load impedances 36 are mounted on the base plate 24 and are insulated therefrom by respective mounting posts or assemblies which are designated generally by the reference numeral 38. The assemblies 38 maintain the impedances 36 in spaced relation to the plate 24 to facilitate heat dissipation by exposing all surfaces of the impedances to the air.

The mounting assemblies 38 include two inverted insulating channels 40 and 42 which extend longitudinally in the housing 10. The channels 40 and 42 are transversely spaced from each other and are connected to the base plate 24 by longitudinally spaced screws (not shown) which are received in appropriate threaded apertures in the plate 24. The supporting assembly for a pair of impedances 36 is shown in detail in FIG. 4. Thus, a plurality of longitudinally spaced through bores 46 are provided in the channels 40 and 42. Received in each one of the through bores 46 is an upstanding elongated screw 48, the head of which engages the lower surface of the web of the channels 40 and 42 and is spaced from the plate 24. Accordingly, the screw 48 shown in FIG. 4 is insulated from the plate 24 by the respective channels 40 and 42.

Surrounding the elongated screw 48 is a spacing sleeve 50 which, together with the screw 48, provides a spacing post for the load impedances 36 which maintain the impedances in spaced relation to the plate 24. Received on the sleeve 50 is a washer 52. Threaded onto the threaded upper end of the screw 48 is a nut 54 which is in tight engagement with the washer 52 and which maintains the head of the screw 48 against the web of the channel 40 and in the aforementioned spaced relation to the plate 24. Received on the nut 54 is another washer 56.

Each one of the load impedances 36 is provided with circular terminal ends 58. The circular end of one of the load impedances 36 is received about the screw 48 and is sandwiched between the washer 56 and a washer 60. The terminal end 58 of an adjacent load impedance 36 is received on the washer 60 and another washer 62 is received on the screw 48 in abutment with the terminal end 58 of the adjacent load impedance. A lock washer 63 abuts the washer 62. A nut 64 is threaded onto the end of the screw 48 thereby to maintain the washer and the terminal ends 58 of the load impedances 36 in tight engagement with each other to provide a good electrical contact between the terminal ends 58 of the adjacent load impedances 36. The contact end 97 of one of a plurality of connecting leads 98 is received on the screw 48 in abutment with the nut 64 and it is maintained in place by a lock washer 65 and a nut 67. However, it is to be noted that only one terminal end of an impedance 36 will be connected to an end post since there are no adjacent impedances to connect thereto.

Thus, the assemblies 38, in addition to mounting the load impedances 36 on the plate 24 in spaced relation thereto and insulated therefrom also provides a means for electrically connecting together adjacent ones of the load impedances 36.

The free ends of the adjacent load impedances 36 are connected together by connecting means designated generally by the reference numeral 66 in FIG. 4. The connecting means 66 includes a threaded screw 68 which receives a washer 70 thereon. Abutting the washer 70 is the terminal end 58 of one of the load impedances 36. A washer 72 abuts the terminal end of the load impedance and receives the terminal end of the adjacent load impedance 36 in abutting relation thereto. Another washer 74 is received on the terminal end of the adjacent load impedance and a lock washer 75 and a nut 76 is tightly secured on the end of the screw 68 to maintain the terminal ends of the adjacent load impedances 36 in good electrical contact with each other.

Received on the screw 68 and abutting the nut 76 is the contact end 97 of another one of the leads 98. A lock washer 77 abuts the contact 97 and a nut 79 maintains the contact 97 in place in good electrical contact with the load impedances 36.

It will be obvious that all the load impedances overlying the channel 40 will be connected in series by the respective mounting assemblies 38 and the connecting means 66. Similar comments apply to the load impedances 36 associated with the channel 42. Moreover, lead 78 (FIG. 3) connects together one end of the series connected load impedances 36 associated with the respective channels 40 and 42. The other ends of the series connected load impedances 36 are connected to terminals 81 by respective leads 80. Also connected to the terminals 81 are leads 83 from the lamp socket 30.

As noted hereinabove, contact elements are provided for connecting each one of the individual load impedances 36 across a different pair of terminals 16 of the battery cells by looped, flexible leads 98 which minimize heat transfer to the plungers. More specifically, the contact elements comprise a plurality of plungers 82 (FIGS. 2 and 4) which are movably supported by the housing 10. The plungers 82 are positioned in the housing 10 so that a different pair of plungers is connected to the respective ends of the respective load impedances 36 and each pair of plungers is adapted to engage the terminals 16 of a different one of the cells, thereby to connect across a respective load impedance 36.

Since the construction of each of the plungers 82 and the respective positioning means which positions and insulates the plungers is identical for each one of the plungers 82, only one plunger assembly will be described in detail. Thus, as shown in FIG. 4, aligned bores 84 are provided in the plates 24 and 26. The sheets 86, 88 and 90 are provided with coaxial through bores 84 in the plates 24 and 26. The bores 92 are of smaller diameter than the bores 84. A plunger 82 is slidably received in the bores 84 and the bores 92. Since the bores 92 are of smaller diameter than the bores 84, the bores 92 will maintain the plunger 82 in spaced relation to the plates 24 and 26 therby to insulate the plungers 82 from the respective plates.

The plunger 82 is maintained in place in the bores 92 and 84 by means which includes an integral, radially extending flange 94 which is positioned intermediate the ends of the plunger. A biasing spring 96 is received about the plunger 82 and extends between the insulating sheets 86 and 88. The spring 96 abuts a washer 93 at one end which is biased into engagement with the sheet 86, and the radially extending flange 94 at the other end. In other words, the spring 96 biases the flange 94 into engagement with the sheet 88 thereby to bias the plunger 82 downwardly so that the plunger extends beyond the lower surface of the sheet 90. The engagement of the sheet 88 with the flange 94 limits the downward travel of the plunger 82.

The plunger 82 is connected to one end of a load impedance 36 by the lead 98. As noted above, the lead 98 terminates in a contact end 97 having an aperture therein. Moreover, the lead 98 minimizes heat transfer between the load impedances 36 and the plungers 82. A screw 102 is received through the aperture in the contact 97 and is threadedly engaged in a threaded aperture which extends downwardly from the top surface of the plunger 82 to connection with the plunger 82. The lower end of the plunger 82 terminates in an inverted truncated cone portion 104 which is adapted to facilitate the connection of the plunger 82 with a terminal 16 of a cell.

As shown in FIGS. 1 and 5, the lower plate 26 is provided with a depending peripheral flange 106. As noted hereinabove, the housing 20 is adapted to be received on the container 14. Accordingly, the depending flange 106 is sized to receive the upper portion of the side walls defining the container 14 in juxtaposed relationship to the inner surface thereof to facilitate alignment of the container 14 with the housing 20. Moreover, pads 107 (FIG. 5) are positioned adjacent to diagonally opposed corners of the plate 26 to prevent relative movement between the housing 20 and the container 14.

As noted hereinabove, the battery cells are in a preselected arrangement in the container 14 in a predetermined orientation, the plungers 82 will contact the respective terminals 16 of the cells comprising the battery pack 12 so that a unidirectional current flows through the series loop of load resistors or impedances 36. Accordingly, it is imperative that the housing 20 be aligned with the container 14 so that when the housing 20 is mounted on a container 14 the plurality plungers 82 will contact the terminals 16 to provide such unidirectional current flow. Accordingly, indexing means designated generally by the reference numeral 108, are provided to align the housing 20 in said predetermined orientation.

More particularly, the indexing means 108 includes insulating sleeves 110 which are positioned adjacent the front edge of the peripheral flange 106. The insulating sleeves 110 are connected to the plate 106 by respective screws 112 (FIG. 5). The sleeves 110 are adapted to be received in longitudinally spaced apertures 114 in the battery pack 12 thereby to align the housing 20 with the container 14 so that the plurality of plungers 82 are connected with the terminals 16 to obtain the aforementioned unidirectional current flow through the load impedances. Additionally, the sleeves 110 prevent the plungers 82 from contacting the terminals 16 of the battery cells when the housing 20 is incorrectly aligned with the container 14. Hence, the apparatus 10 will be inoperative unless it is properly attached to the battery or battery pack 12.

In operation, the housing 20 is spaced above the battery pack container 14 with the insulating sleeves 110 aligned with the apertures 114. The housing 20 is then lowered onto the top of the container 14, so that the sleeves 110 are received in the apertures 114. It is to be noted that if the housing 20 is in any other orientation relative to the container 14, the sleeves 110, which project beyond the ends of the plungers 82, will contact the top of the cells thereby preventing further downward movement of the housing 20 relative to the container 14. To put it another way, the sleeves 110 and the apertures 114 provide a means for preventing any other orientation of the battery discharge apparatus 10 with respect to the battery pack 12 other than the predetermined orientation noted above which results in the unidirectional current flow through the load impedances.

As the housing 20 is lowered onto the open top of the container 14, the plungers 82 engage the terminals 16 of the respective cells. Continued downward movement of the housing 20 causes the plungers 82 to move upwardly in their respective bores 84 and 92 from their solid line position shown in FIG. 4 to the phantom line position thereof against the bias of the springs 96 until the top edge of the container 14 engages the pads 107. It will be obvious that at this point the radial extending flanges 94 of the plungers 82 will be spaced from the sheet 88 and the springs 96 will exert a force on the respective radial flanges 94 which will cause the plungers 82 to move into tight mechanical and electrical engagement with the respective terminals 16 of the battery cells.

A pair of diagonally spaced arms 116 are provided to connect the housing 20 with the casing 14 to prevent their accidental separation. The arms 116 are pivotally connected to the housing 20 by respective pivot pins 118. The arms 116 are provided with opposed slots 117 which are adapted to engage projections 122 on the casing 14 to clamp together the housing 20 and the battery pack 12.

As shown in the schematic wiring diagram of FIG. 6, the plungers 82 are positioned to connect the positive terminal of each one of the battery cells to the negative terminal of the next adjacent cell in addition to connecting each cell across a respective loading impedance. Accordingly, current will flow through the load impedance in the direction indicated by arrowhead 124. The current will also flow through the lamp 32 which is connected in series with the load impedance 36 thereby to illuminate the same.

It will be obvious that if the potential of one of the battery cells falls with respect to the other cells, the current which flows through the battery having the decreased potential will still be from the negative electrode to the positive electrode thereby to maintain correct current flow through the battery to prevent any cell destruction or the like. That is, the current through the battery cells cannot reverse itself albeit the potential of one of the cells may fall below the potential of the other cells.

As the battery cells are discharged, the current through the lamp 32 decreases and, accordingly, the intensity of the lamp 32 continuously decreases. After the cells 16 have been completely discharged, the lamp 32 will go out thereby to signify the end of a discharge cycle. Accordingly, the battery discharging apparatus 10 may be removed and the battery pack recharged in the conventional manner.

Accordingly, battery discharge apparatus has been provided which is simple in construction and easy to operate and which prevents current reversal through a battery cell comprising the battery pack due to an unbalanced state of charge during the discharge cycle of the battery pack. Moreover, the battery discharge apparatus of the present invention is operable to bring all of the cells to the same state of discharge so that the cells should attain a uniform capacity charge after the next charge cycle.

What is claimed is:

1. A battery discharge apparatus for discharging a battery having individual cells positioned in a preselected arrangement and having their terminals connected in a series loop between two output terminals comprising
   a housing sized to be received on said battery, individual load impedances in said housing for each battery cell,
   lead means for connecting said load impedances in a series loop,
   a pair of plungers for each of said load impedances,
   mounting means for mounting each of said pair of plungers on said housing and for positioning each of said pair of plungers so that each of said pair of plungers engages the terminals of a different battery cell,
   connecting means for connecting the individual plungers comprising each of said pair of plungers to the ends of respective load impedances so that each of said load impedances is connected between a different one of each of said pair of plungers, said connecting means further connecting each of said pair of plungers with said respective load impedances so that a unidirectional current flows through said series loop of load impedances when said housing is received on a battery in a predetermined position with respect thereto,
   and indexing means on said housing engageable with a battery to align said housing in said predetermined position relative to the battery.

2. A battery discharge apparatus as in claim 1,
   in which said load impedances comprise Nichrome resistors having equal resistance values.

3. A battery discharge apparatus as in claim 1,
   in which said housing includes a first plate and a second plate spaced from said first plate,
   and means for mounting said load impedances on said first plate in spaced relation thereto, and insulating said load impedances therefrom to facilitate heat dissipation from said load impedances.

4. A battery discharge apparatus as in claim 3,
   wherein said insulating means includes an insulating channel mounted on said first plate,
   a plurality of posts connected to said channel and spaced from said first plate,
   each one of said plurality of posts being spaced from the next adjacent post,
   and terminal means for connecting the ends of predetermined ones of said load impedances to said posts.

5. A battery discharge apparatus as in claim 3,
   in which said mounting means includes a first insulating sheet connected to said first plate and a second insulating sheet connected to said plate,
   aligned through bores in said first and second plates and said first and second insulating sheets,
   the bores in said first and second insulating sheets having a smaller diameter than the bores in said first and second plates,
   a different one of said plungers being received in respective ones of said aligned bores whereby the aligned bores in said first and second insulating sheets maintain said plungers in spaced relation to the walls defining the aligned bores in said first and second plates,
   and retaining means for maintaining said plungers in said bores.

6. A battery discharge apparatus as in claim 5,
   in which said retaining means includes a radially extending flange on each of said plungers adapted to engage the upper surface of said second insulating sheet,
   and biasing means for each plunger for biasing said radially extending flange into engagement with said second insulating plate, whereby said biasing means is operable to bias said plungers into good electrical contact with the terminals of the battery cells.

7. A battery discharge apparatus as in claim 5,
   in which each of said pairs of plungers are provided with an inverted truncated cone at the bottom end thereof to facilitate electrical contact with the terminals of battery cells.

8. A battery discharge apparatus as in claim 1,
   in which said indexing means includes at least a pair of spaced insulating posts adapted to be received in complementary formed bores in a battery to align said housing in said predetermined position.

9. A battery discharge apparatus as in claim 1,
   and arms connected to said housing and being engageable with projections on a battery to clamp said housing on said battery.

10. A battery discharge apparatus as in claim 1,
    and a lamp connected in said series loop of load impedances and adapted to be illuminated when current flows in said series loop of load impedances.

11. In combination, a battery pack and a battery discharge apparatus for discharging said battery pack;
    said battery pack comprising a container having a plurality of individual battery cells therein arranged in a preselected orientation;
    each of said plurality of battery cells having a positive and a negative terminal;
    a pair of output terminals on said container,
    and lead means for connecting said positive and negative terminals of said individual battery cells in a series loop between said pair of output terminals;
    said battery discharge apparatus including a housing received on said container, in a predetermined orientation,
    a load impedance in said housing for discharging the respective cells,
    a plurality of pairs of contact means for connecting said load impedance across respective ones of said plurality of battery cells,
    mounting means for mounting and for positioning said plurality of pairs of contact means on said housing so that each pair of contact means engages the output terminals of a different battery cell,
    and lead means for connecting each of said plurality of pairs of contact means across different portions of said load impedance and for connecting the positive terminal of said battery cells to the negative terminal of the next adjacent battery cell so that a unidirectional current flows through said load impedance.

12. The combination of claim 11, and indexing means between said housing and said battery pack for aligning said housing in said preselected orientation.

13. The combination of claim 11, in which said load impedance comprises individual resistors for each of said plurality of battery cells connected together in a series loop.

14. The combination of claim 13, and signalling means connected in said series loop for signalling the termination of a discharge cycle.

15. A battery discharge apparatus for simultaneously discharging a plurality of battery cells comprising
   a housing,
   a plurality of load impedances in said housing connected together in a series loop,
   a pair of contact means connected to the ends of each one of said plurality of load impedances,
   and support means for movably mounting said pairs of contact means on said housing and for positioning said pairs of contact means in a preselected orientation so that each pair of contact means engages the terminals of a different battery cell,
   whereby said pairs of contact means may be moved into tight electrical contact with the terminals of battery cells.

16. A battery discharge apparatus as in claim 15, and biasing means for biasing said pairs of contacts into electrical and mechanical engagement with the terminals of battery cells.

17. A battery discharge apparatus for simultaneously discharging a plurality of battery cells comprising a plurality of linear load impedances equal in number to the plurality of battery cells for providing substantially the entire load on the cells, lead means for connecting said plurality of load impedances in a series loop, and contact means for connecting respective ones of said load impedances across different ones of said plurality of battery cells.

18. Battery discharge apparatus as in claim 17, in which said plurality of load impedances are equal in value.

References Cited

UNITED STATES PATENTS

| | | | |
|---|---|---|---|
| 953,640 | 3/1910 | Patterson | 320—3 X |
| 1,637,015 | 7/1927 | Umsted et al. | 320—17 |
| 2,624,033 | 12/1952 | Jacquier | 320—53 |
| 2,904,739 | 9/1959 | Reed | 320—48 X |
| 3,221,239 | 11/1965 | Langer et al. | 320—17 |
| 3,321,690 | 5/1967 | McCarthy et al. | 320—6 |
| 3,343,058 | 9/1967 | Deschamps et al. | 320—17 |
| 3,348,117 | 10/1967 | Howden | 320—25 X |

JOHN F. COUCH, Primary Examiner

S. WEINBERG, Assistant Examiner

U.S. Cl. X.R.

320—25, 48, 51